United States Patent [19]

Poetsch et al.

[11] 4,360,830
[45] Nov. 23, 1982

[54] METHOD FOR HORIZONTAL AND VERTICAL CONTOUR CORRECTION OF A DIGITIZED ANALOGUE SIGNAL

[75] Inventors: Dieter Poetsch, Ober-Ramstadt; Werner Becker, Mainz; Helmut Rädecke, Darmstadt; Volker Massmann, Mühltal, all of Fed. Rep. of Germany

[73] Assignee: Robert Bosch GmbH, Stuttgart, Fed. Rep. of Germany

[21] Appl. No.: 185,412

[22] Filed: Sep. 9, 1980

[30] Foreign Application Priority Data

Sep. 20, 1979 [DE] Fed. Rep. of Germany ....... 2937958

[51] Int. Cl.$^3$ .................... H04N 5/14; H04N 9/535
[52] U.S. Cl. .................... 358/162; 358/166; 358/37
[58] Field of Search ............ 358/162, 166, 37; 364/515

[56] References Cited

U.S. PATENT DOCUMENTS 3,729,580  4/1973  Schneider ................. 358/37
3,804,980  4/1974  Lowry .................... 358/162

OTHER PUBLICATIONS

Schönfelder, "Farbträgerfalle", *Farbfernsehen*$^2$, pp. 153–155, published 1966.
Nezer, "Active Notch Filters", *Wireless World*, Jul. 1975, pp. 307–311.
Vrijer, "Advanced Techniques for Plumbicon Cameras", *Journal of the SMPTE*, Nov. 1966, vol. 75, pp. 1080–1082.

*Primary Examiner*—John C. Martin
*Attorney, Agent, or Firm*—Frishauf, Holtz, Goodman & Woodward

[57] ABSTRACT

A method and apparatus is proposed for the H and V-contour correction of a digitized video signal wherein after deriving a digital correction signal, both the main video signal and the correction signal are D/A converted. The H and V-detail signals are then derived from the analogue correction signal, are combined with a contour correction signal and are added in a suitable manner to the main video signal.

9 Claims, 3 Drawing Figures

METHOD FOR HORIZONTAL AND VERTICAL CONTOUR CORRECTION OF A DIGITIZED ANALOGUE SIGNAL

BACKGROUND OF THE INVENTION

The present invention relates to the reconstruction of an analogue signal from a digitized version of the signal, and more particularly to a method and apparatus for horizontal and vertical contour correction of a digitized analogue signal. Preferably the signal is a television video signal.

From "BBC Report BBC RD 1978/10" a digital aperture correction is already known which is, however, relatively expensive since steep digital low pass filters are used which require high scanning frequencies. Moreover, the production of the filters required for that purpose is not flexible enough. Further, an additional deterioration in the signal-to-noise ratio occurs due to an additional correction signal branch.

SUMMARY OF THE INVENTION

The present invention provides a method for the horizontal and vertical contour correction of a digitized video signal in which the said video signal is delayed twice by one line, is tapped off as a main video signal after a one line delay, the two line delayed video signal and the undelayed video signal are added and their sum is subtracted from the video signal delayed by one line so as to form a correction signal, the improvement comprising converting both the digitalised main video signal and the digitalised correction signal to analogue signals, deriving an H and V-detail signal from the correction signal, adding the H and V-detail signals together, and adding the thus generated signal to the main video signal as a contour correction signal.

The method in accordance with the invention has the advantage that, due to the further analogue signal processing, filtering and gain adjustment can be carried out substantially more simply and better since they take place without scanning frequencies. The H contour correction is especially simplified since it is not dependent on a plurality of scanning rasters.

BRIEF DESCRIPTION OF THE DRAWINGS

Embodiments of the invention are described in detail in the following specification with reference to the accompanying drawings, in which.

DESCRIPTION OF THE PREFERRED EMBODIMENTS

Figure 1:
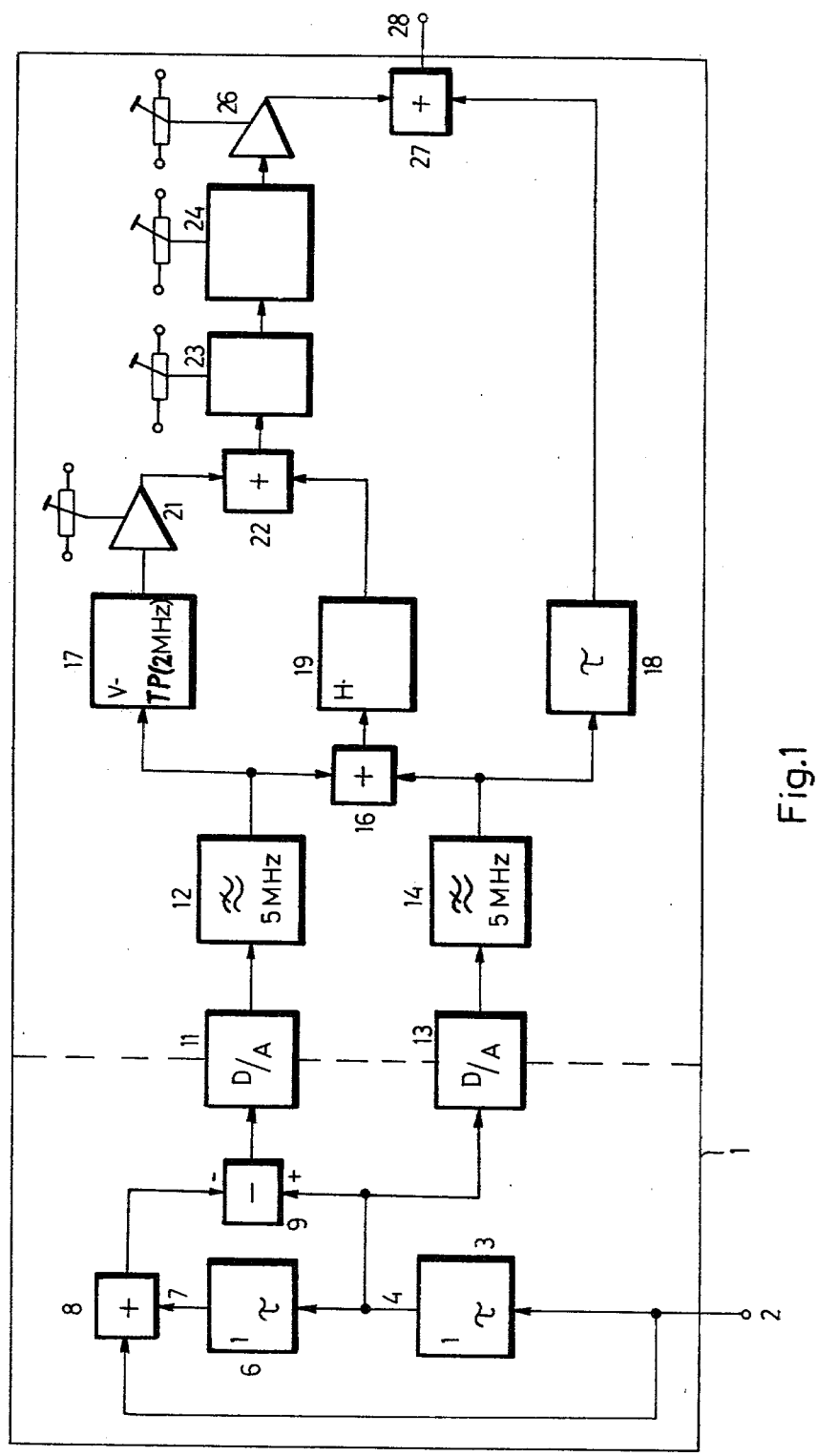
FIG. 1 is a block circuit diagram for carrying out the method in accordance with the invention.

A digitized T.V. video signal to be corrected is transmitted to the arrangement 1 at a terminal 2 and arrives in a first delay device 3 which delays the video signal by the duration of one line period. The delay device 3 is, for example, a freely addressable memory. The delayed video signal which is taken from the output 4 of the delay device 3 represents, after the addition of the correction signals, the output signal from the arrangement.

The video signal delayed by the duration of a line period is delayed by the duration of a further line period by a second delay device 6 so that, at an output 7 from the said device 6, it is delayed by two line periods with respect to the signal supplied to the terminal 2. The undelayed video signal and the signal delayed by two line periods are fed to an adding stage 8, the output signal from which is applied to the negative input to a subtraction stage 9. The video signal delayed by one line period is applied to the positive input to the said stage 9. The digital output signal from the stage 9 is converted into an analogue signal in a D/A converter 11 and is transmitted to a low pass filter (5 MHz) 12.

The digital video signal from the output 4 from the delay device 3 is likewise applied to a D/A converter 13 in which it is converted into an analogue main video signal. The output from the D/A converter 13 is likewise connected to a low pass filter (5 MHz) 14. The outputs from the low pass filters 12 and 14 are connected to respective inputs to an adding stage 16. Further, the output from the low pass filter 12 is applied to a low pass filter (2 MHz) 17 for the generation of the V-contour correction signal while the output from the low pass filter 14 is also applied to a time delay unit 18 in the transmission branch for the main video signal.

For generating an H-contour correction signal, the output signal from th stage 16 is transmitted to an H-detail shaper 19 which is constructed similarly to the part generating the correction signal comprising the devices 3 to 9. Beyond the low pass filter 17, the V-contour correction signal is then transmitted to an input to a further adding stage 22 through a control amplifier 21 by means of which the amplitude of the correction signal is adjustable. The H correction signal from the H-detail shaper 19 is transmitted directly to the other input to the adding stage 22 in which the two correction signals are then combined to form a combined correction signal for the vertical and horizontal contour correction.

The combined contour correction signal taken from the output from the adding stage 22 then passes through a notch filter 23 of adjustable frequency and a noise limiting stage 24 by which the noise component in the combined correction signal is for the most part suppressed or is at least substantially attenuated. Finally, the combined correction signal passes through a control amplifier 26 for adjusting the amplitude of the correction signal and is fed to an input to a further adding stage 27. The main video signal passed through the time delay unit 18 is applied to the other input to the adding stage 27. In the said adding stage 27, the combined contour correction signal is added to the main video signal which has been delayed by one line period and delayed by passage through the time delay unit 18. The corrected signal can then be taken from the output 28 from the described arrangement.

Figure 2:
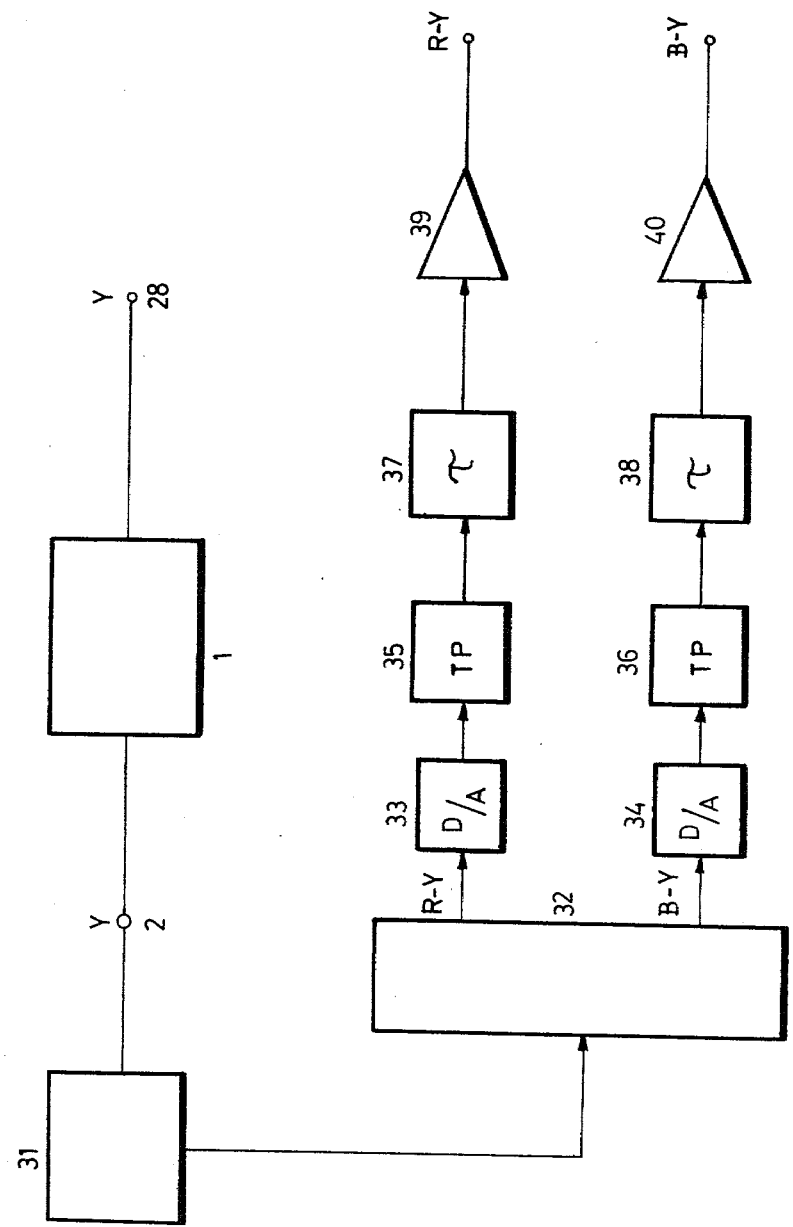
FIG. 2 is a block circuit diagram of a three channel colour television system.

The use of the arrangement shown in FIG. 1 will be described in relation to a three channel colour television system as illustrated in FIG. 2 and which consists of the luminance channel Y and the chrominance channels R-Y and B-Y. The digital luminance signal is read out from a frame store 31 and is transmitted to the contour correction arrangement 1 described in FIG. 1. For transmitting the chrominance signals R-Y and B-Y, the store 31 is addressed in accordance with one line delay so that the signals R-Y and B-Y are delayed by one line period with respect to the read out luminance signal and are transmitted to a demultiplexer 32. The two channels R-Y and B-Y connected to the demultiplexer 32 are of similar construction and likewise each include a D/A converter 33 or 34, a low pass filter 35 or 36, a time delay unit 37 or 38 for matching the time delay of the signals to the luminance signal Y as well as a respective amplifier 39 or 40.

Figure 3:
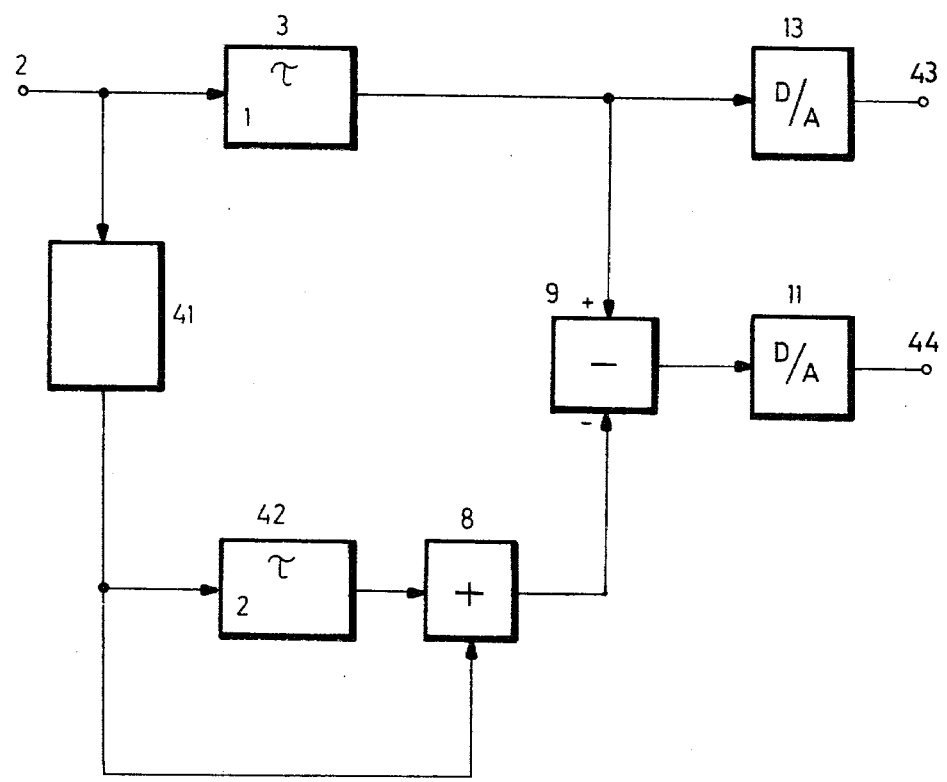
FIG. 3 is a portion of a further circuit diagram for carrying out an advantageous variant of the method in accordance with the invention.

FIG. 3 shows a portion of the contour correction circuit illustrated in FIG. 1 wherein like parts are provided with like references. Once again, a digitalised video signal is applied to the terminal 2, which is transmitted on the one hand to the line delay device 3 and on the other hand is read into a half frame store 41. The video signal read out of the half frame store 41, which is thus delayed by one half frame, is transmitted on the one hand directly to one input to the adding stage 8 and on the other hand is transmitted through a delay device 42 for delaying the video signal by two line periods to the other input to the adding stage 8. The output signal from the adding stage 8 is then transmitted to the negative input to the subtraction stage 9 whilst the main video signal delayed by one line is transmitted to the positive input. The output signal from the time delay unit 3 as well as the output signal from the subtraction stage 9 are once again D/A converted in the D/A converters 13 and 11 so that analogue signals can be taken from the respective output terminals 43 and 44. These analogue video signals are then further processed in a corresponding manner according to FIG. 1.

This arrangement has the advantage that the contour correction signal is not derived from a half frame but from a full frame. This results in a more accurate V-contour correction of the video signals to be corrected. A greater slope of the vertical contour correction signal can be generated by access to the intermediate lines of the second half frame.

What is claimed is:

1. In a method for the horizontal and vertical contour correction of a digitized video signal in which the said video signal is delayed twice by one line, is tapped off as a main digitalized video signal after a one line delay, the two line delayed video signal and the undelayed video signal are added and their sum is subtracted from the video signal delayed by one line so as to form a digitalized correction signal, the improvement comprising converting both the digitalized main video signal and the digitalized correction signal to analogue signals, deriving an H and a V-detail signal from the analogue correction signal, adding the H and V-detail signals together, and adding the thus generated signal to the analogue main video signal as a contour correction signal.

2. A method according to claim 1 characterized in that the analogue main video signal and the analogue correction signal are added for generating the H-detail signal and that the thus generated signal sum is transmitted through an H-detail shaper circuit.

3. A method according to claim 1 characterised in that the V-detail signal is generated by low pass filtering of the correction signal.

4. A method according to claim 1 characterised in that the amplitude V-detail signal is adjustable.

5. A method according to claim 1 characterised in that the signal sum of the H and V-detail signals is noise limited.

6. A method according to claim 1 characterised in that the amplitude of the contour correction signal is adjustable.

7. A method according to claim 1 for three channel colour signals wherein only one signal, preferably the luminance signal, is contour corrected, characterised in that, for adapting to the time delay of the three colour signals, the two non-corrected signals are delayed by one line.

8. A method for the horizontal and vertical contour correction of a digitized video signal, comprising the steps of storing the video signal in half frames, adding the video signal of a stored half frame after a two line delay to the same stored half frame as provided without the two-line delaying step to produce a sum signal for the stored half frame, delaying the video signal of the other, non-stored, half frame by one line and tapping off the other, non-stored, half frame video signal thus delayed by one line as a main video signal, subtracting said sum signal of the stored half frame from the one-line delayed video signal of the other half frame for forming a correction signal, converting the main video signal and the correction signal to analogue signals, deriving H and V-detail signals from the correction signal, adding the detail signals together, and adding the thus generated signal to the main video signal in a suitable manner as a contour correction signal.

9. Apparatus for the horizontal and vertical contour correction of a digitized video signal comprising first means for delaying the video signal by a period of one line of video, second means for delaying the delayed video signal by a period of one line of video, first adding means for adding together an undelayed video signal and the delayed video signal from the second delaying means, subtracting means for subtracting the output from the adding means from the output from said first delaying means to form a correction signal, a first digital to analogue converter for converting the correction signal to an analogue correction signal, a second digital to analogue converter for converting the output from the first delaying means to form an analogue main video signal, means for deriving H and V-detail signals from the analogue correction signal, second adding means for adding the H and V-detail signals together to form a contour correction signal, and third adding means for adding the contour correction signal to the analogue main video signal.

* * * * *